(12) United States Patent
Sasaki et al.

(10) Patent No.: US 7,723,982 B2
(45) Date of Patent: May 25, 2010

(54) TESTING AND MANUFACTURING METHOD OF MAGNETIC HEADS

(75) Inventors: Shinji Sasaki, Kanagawa (JP); Makoto Torigoe, Yokohama (JP); Takayoshi Ohtsu, Kanagawa (JP); Kouji Kataoka, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 691 days.

(21) Appl. No.: 11/656,337

(22) Filed: Jan. 19, 2007

(65) Prior Publication Data
US 2007/0188167 A1 Aug. 16, 2007

(30) Foreign Application Priority Data
Jan. 20, 2006 (JP) ............................. 2006-012125

(51) Int. Cl.
*G01R 33/12* (2006.01)
*G01B 7/14* (2006.01)

(52) U.S. Cl. ....................................... 324/210; 324/212

(58) Field of Classification Search ................. 324/210, 324/212
See application file for complete search history.

(56) References Cited
FOREIGN PATENT DOCUMENTS
JP 2004-022024 1/2004

*Primary Examiner*—Reena Aurora
(74) *Attorney, Agent, or Firm*—Townsend and Townsend and Crew LLP; Rambod Nader (57) ABSTRACT

A magnetic head suffers mechanical stresses by striking against a magnetic disc surface and dust, so that there are problems such as the reduction of reproduction output due to the mechanical stresses and the reversal of output polarity due to the mechanical stresses. Embodiments in accordance with the present invention relate to a method of testing reliability of reproduction elements of a magnetic head against outside stress. In a first step, a Giant Magnetoresistive (GMR) element on a row bar of the object of inspection, or a GMR element on a slider is measured for the output against external magnetic field. In the next step, prescribed shearing stress is applied with indenter to the edge where the GMR element-formed surface of the row bar or slider and the air-bearing surface are crossed. Then, output of the GMR element is measured again. Lastly, the outputs of the GMR element before and after application of stress are compared. When the amount of degradation is higher than the prescribed standard, the product is regarded as disqualified. Satisfaction of the prescribed standard is regarded as acceptance.

9 Claims, 10 Drawing Sheets

TESTING AND MANUFACTURING METHOD OF MAGNETIC HEADS

CROSS-REFERENCES TO RELATED APPLICATIONS

The instant nonprovisional patent application claims priority to Japanese Patent Application 2006-012125, filed Jan. 20, 2006 and incorporated by reference herein for all purposes.

BACKGROUND OF THE INVENTION

Embodiments in accordance with the present invention relate to a magnetic head and magnetic disc drive, in particular to the reliability of the reproduction elements of a magnetic head against the stress from the outside.

A prior art method of inspecting the reproduction elements of a magnetic head is disclosed in patent document JP-A-2004-22024. This patent document describes a method of measuring the output characteristics of a magneto-resistive effect type head in the state of applying alternating magnetic field without using a magnetic disc, and further, of measuring noise, output waveform fluctuation, and waveform asymmetric fluctuation, in addition to output fluctuation. Measurement is performed with varying magnetic field and temperature to the magnetic head as disturbance. An inspecting method is performed by measuring a lability of the reproduction elements in a static state, wherein a magnetic head showing lability higher than tolerance can be selectively excluded.

In the inspecting method as disclosed in JP-A-2004-22024 and described above, of the stresses applied to the reproduction elements in a practical magnetic disc drive, only temperature is made an issue. In a practical magnetic disc drive, a magnetic head suffers mechanical stresses by striking against a magnetic disc surface and against dust, so problems arise such as the reduction of reproduction output of the magnetic head, and the reversal of output polarity. It is desirable to provide a magnetic head having resistance to these stresses.

BRIEF SUMMARY OF THE INVENTION

A magnetic head suffers mechanical stresses by striking against a magnetic disc surface and dust, so that there are problems such as the reduction of reproduction output due to the mechanical stresses and the reversal of output polarity due to the mechanical stresses. Embodiments in accordance with the present invention relate to a method of testing reliability of reproduction elements of a magnetic head against outside stress. As indicated in the illustrated embodiments, in a first step 100, a Giant Magnetoresistive (GMR) element 540 on a row bar 1 of the object of inspection, or a GMR element 540 on a slider 52 is measured for the output against external magnetic field. In the next step 102, prescribed shearing stress is applied with indenter 4 to the edge where the GMR element-formed surface 2 of the row bar 1 or slider 52 and the air-bearing surface 3 are crossed. Then, in step 104 output of the GMR element 540 is measured again. Lastly, in step 106 the outputs of the GMR element before and after application of stress are compared. When the amount of degradation is higher than the prescribed standard, the product is regarded as disqualified. Satisfaction of the prescribed standard is regarded as acceptance.

For a more complete understanding of the present invention, reference is made to the following detailed description taken in conjunction with the accompanying drawings.

DETAILED DESCRIPTION OF THE INVENTION

An object of an embodiment of the present invention is to provide a method of inspection capable of quantitatively judging whether the reproduction elements of a magnetic head are brittle against mechanical stress.

Another object of an embodiment of the present invention is to provide a method of manufacture of a magnetic head having a reproduction elements having sufficient resistance against mechanical stresses, and to provide the magnetic head.

A further object of an embodiment of the present invention is to provide a magnetic disc drive that is high in reproduction signal quality and highly reliable.

Fining of reproduction elements of a magnetic head utilizing magneto-resistive effect, in particular GMR (Giant Magneto-resistive) effect, is advancing with the improvement of magnetic recording density, and the improvement of smaller width of elements, which is now approximately 200 nm or less. A magnetic vector of a fixed layer that is the standard of the direction of magnetization in elements is likely to be labile with the fining of the forms of elements, and a phenomenon that the output of elements decreases during the manufacturing process of a magnetic head or during the operation of reading and writing after being built in a magnetic disc drive has occurred. Regarding the phenomenon, by the analysis of electric characteristics of reproduction elements under ferromagnetic field of several thousands of Oe (several hundreds of KA/m), it has been found that there is anything unusual in the movement of the fixed layer in GMR element structures. As a result of evaluation by practically applying stresses to ascertain whether it is the cause of the occurrence supposing various stresses applied to the elements as the cause of the abnormality, it has been found that the mechanical stress applied to the elements may be the main cause.

As the inspection method, an indenter made of resin is pressed against the edge formed by the air-bearing surface of head elements to be inspected and the element-formed surface and slid, and the output characteristics of the GMR element against external magnetic fluctuation are measured before and after sliding, and it was found that there was a case where element output lowered after sliding of the indenter. At this time, shear force corresponding to the pressing force of the indenter is generated on the GMR element in the perpendicular direction to the air-bearing surface, and shear force corresponding to the frictional force generated between the indenter and the air-bearing surface of the head is generated in the track width direction of GMR element. In the case where shear force is applied only in a perpendicular direction to the air-bearing surface of the head elements without sliding the indenter as the control test, the output characteristics of GMR element does not deteriorate. Accordingly, it has been found that the characteristic deterioration of GMR element occurs when shearing stress is applied to the element-formed surface in the track width direction.

The fixed layer of GMR element is magnetized in a perpendicular direction to the air-bearing surface. When stress functions thereto, magnetization vector of the fixed layer is influenced by the magnetization occurring by magneto-striction, but when force is applied in a perpendicular direction to the air-bearing surface, the direction of vector is not changed. However, when stress is generated in the track width direction of the element, the stress is orthogonal to original direction, so that the direction of vector changes. It is believed that when there is no defect in the film structure, the magnetization vector of the fixed layer returns to the original state when the applied stress is removed, but when any defect is generated in the film and hysteresis of magnetic characteristics grows larger, the direction of magnetization vector does not return even after the stress is removed, and as a result, output is reduced.

For achieving the above object, in the inspecting method of a magnetic head in accordance with an embodiment of the present invention, an indenter made of resin is pressed against the edge formed by the air-bearing surface of a magnetic head having magneto-resistive effect elements including a fixed layer and a free layer and the element-formed surface and the indenter is slid to apply shearing stress in parallel direction to the air-bearing surface, and the changes of output of magneto-resistive effect elements against magnetic fluctuation before and after application of shearing stress are measured.

For achieving the above another object, in the manufacturing method of a magnetic head in accordance with an embodiment of the present invention, the air-bearing surface of a magnetic head having magneto-resistive effect elements includes a fixed layer and a free layer that is polished and then the above method of inspection of the magnetic head is carried out, and the magnetic head whose output changes measured is within the tolerance is regarded as the accepted product.

For achieving the above further object, the magnetic disc drive in accordance with an embodiment of the present invention is a magnetic disc drive having a magnetic head that is regarded as acceptable in the above manufacturing method of a magnetic head and a magnetic disc holding the data that are reproduced with the magnetic head.

According to an embodiment of the present invention, whether the reproduction elements of a magnetic head are brittle against mechanical stress can be quantitatively judged. Further, a magnetic head having reproduction elements having sufficient resistance against mechanical stress can be provided. Still further, a magnetic disc drive having high quality of reproduction signals and high reliability can be obtained.

Figure 9:
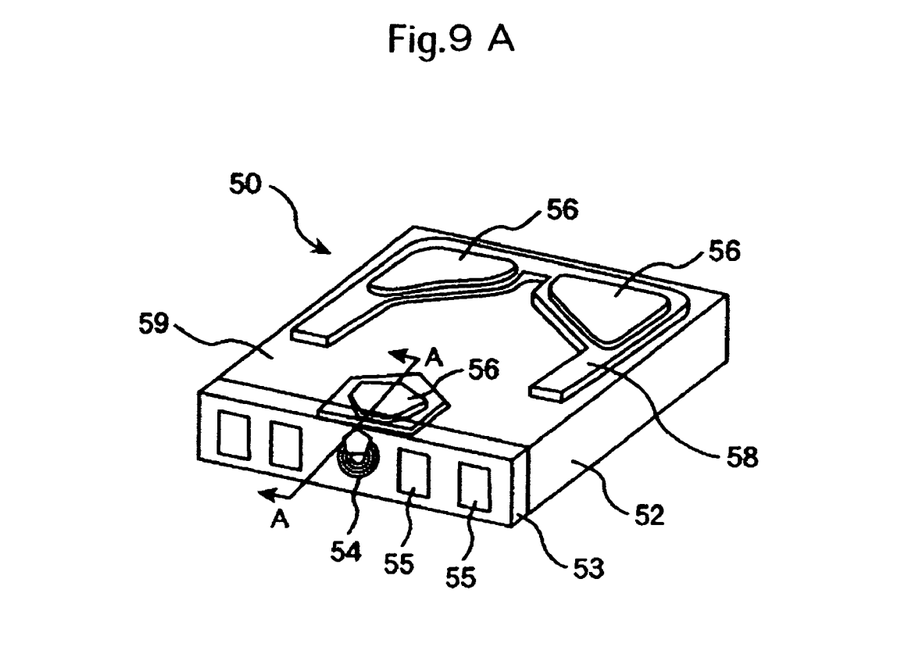
FIG. 9A is a diagonal view of a magnetic head viewing from the air-bearing surface side.
FIG. 9B is a cross-sectional view of A-A line in FIG. 9A.

The mechanisms of a magnetic head, reproduction elements and a magnetic disc drive according to embodiments of the present invention will be described with reference to FIGS. 9A to 11. FIG. 9A is a diagonal view from the air-bearing surface side of magnetic head 50 finished by cutting the row bar with every slider after polishing of air-bearing surface and rail processing, and FIG. 9B is a cross-sectional view showing the head element part along A-A line in FIG. 9A. In FIG. 9A, 52 is a slider composed of a wafer material of ceramics made of altic material (i.e., Al2O3-TiC) or the like. On air-bearing surface 56 that is a surface opposite to a magnetic disc of slider 52 are formed shallow groove rail 58 and deep groove rail 59 of two-stage rail that are necessary for magnetic head 50 to fly on the magnetic disc by a prescribed amount. Protective film 53 is formed on the rear end surface of slider 52, and head element 54 is formed on protective film 53.

With referring to FIG. 9B, head element 54 comprises lower shield film 541 comprising reproduction elements, magneto-resistive effect element (GMR element) 540, and upper shield film 542 formed on protective film 53; and lower magnetic layer 544 comprising an inductive type head that is a recording element, and upper magnetic layer 545 formed on the reproduction elements. Magnetic gap film 546 and coil conductors 547 covered around with insulating material 548 are formed between lower magnetic layer 544 and upper magnetic layer 545. Hard protective film 549 is formed on the recording element, and terminal 55 connected to GMR element 540 is formed on hard protective film 549 (refer to FIG. 9B). Height h from the flying surface of GMR element 540 in the depth direction determines the sensitivity of the reproduction elements, which is called MR element height.

Figure 10:
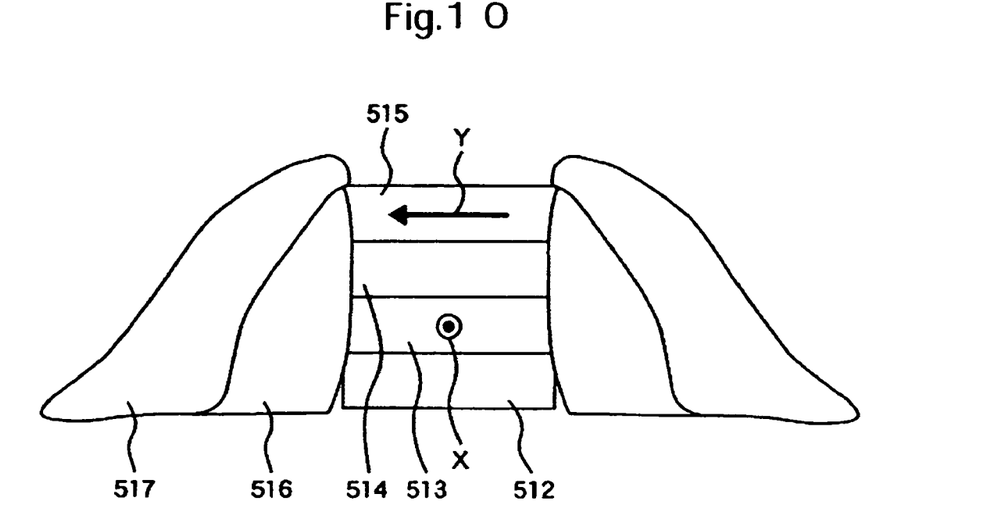
FIG. 10 is an enlarged view of GMR element viewing from the air-bearing surface side.

FIG. 10 is an enlarged view of CIP (Current in the Plane) type GMR element 540 viewing from the air-bearing surface side, which shows the film structure of GMR element 540. In FIG. 10, 512 is an anti-ferromagnetic layer, and 513 and 515 are two ferromagnetic layers and these layers are magnetically separated with nonmagnetic layer 514. On both ends of these magnetic layers are arranged hard bias film 516 and electrode 517. The direction of magnetization X of ferromagnetic layer (fixed layer) 513 is fixed by switched connection magnetic field generating at the interface with anti-ferromagnetic layer 512. Contrary to this, the direction of magnetization Y of ferromagnetic layer (free layer) 515 is variable according to the direction of external magnetic field. The magnetic disc drive reproduces the data on a magnetic disc by utilizing the characteristics that the resistance of GMR element 540 varies according to the angle formed by the directions of magnetizations of fixed layer 513 and free layer 515. Specifically, in the case where the direction of magnetization of fixed layer 513 and the direction of magnetization of free layer 515 are in parallel, the resistance of GMR element 540 becomes minimum, and when anti-parallel, the resistance of GMR element 540 becomes maximum.

Figure 11:
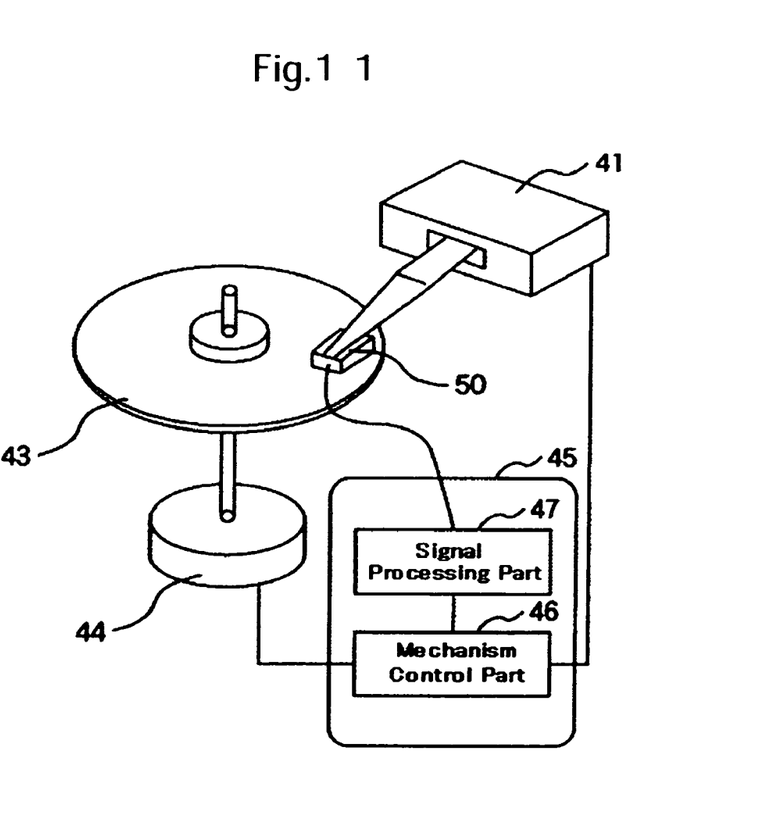
FIG. 11 is a block diagram showing the outline of the magnetic disc drive.

The outline of the magnetic disc drive installing magnetic head 50 is shown in FIG. 11. The magnetic disc drive has magnetic disc 43 holding data, disc drive motor 44 supporting and rotating magnetic disc 43, magnetic head 50 recording or reproducing the data on and from magnetic disc 43, actuator 41 supporting and moving magnetic head 50 in the radius direction, and signal processing substrate 45. Signal processing substrate 45 has mechanism control part 46 and signal processing part 47. Mechanism control part 46 controls actuator 41 and disc drive motor 44, and signal processing part 47 processes recording signal supplied to the recording elements of magnetic head 50 and reproducing signal from reproducing elements of magnetic head 50.

Figure 1:
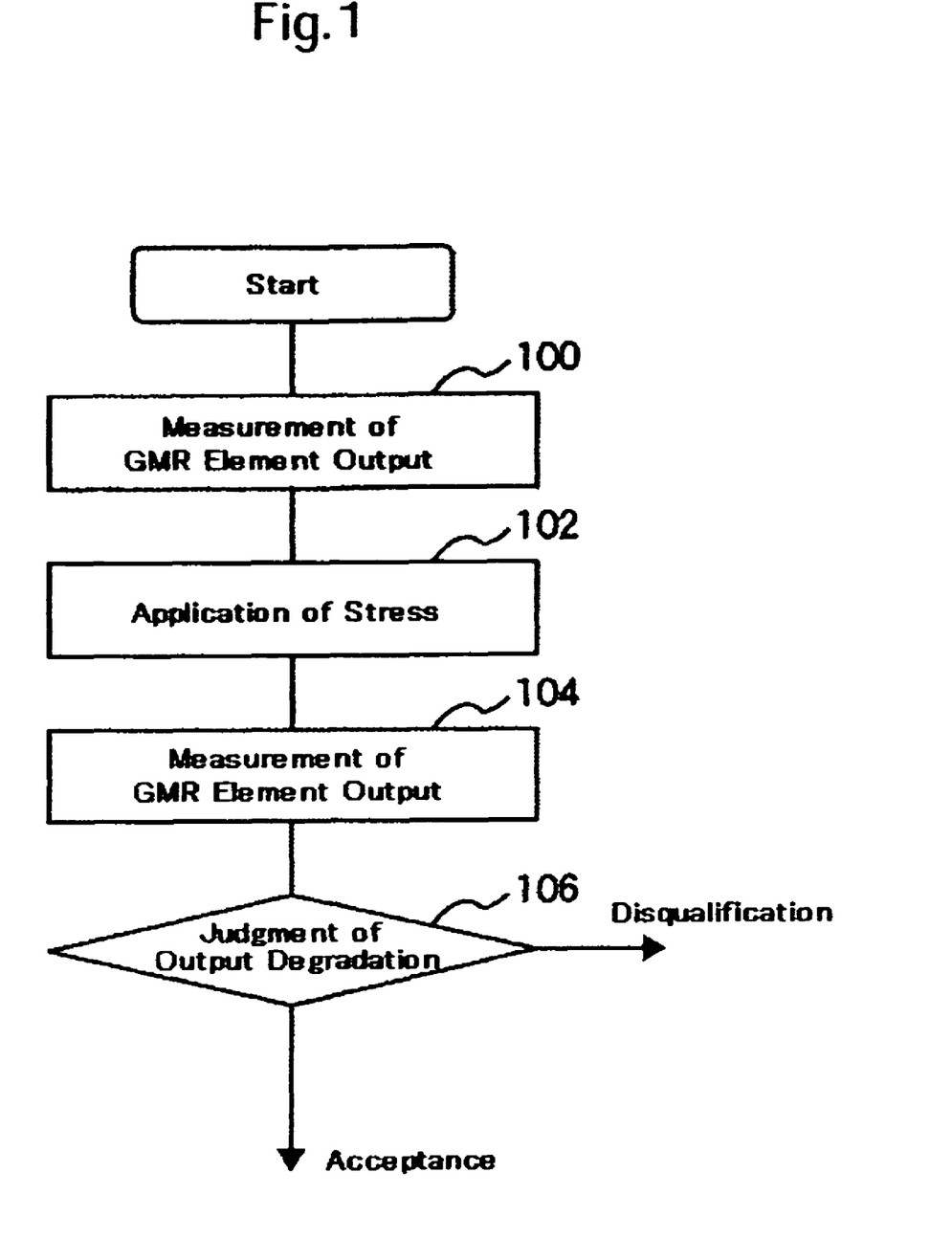
FIG. 1 is a drawing showing the process of the method of inspection of a magnetic head in accordance with an embodiment of the present invention.

The method of inspection of a magnetic head according to an embodiment of the present invention will be described with reference to FIG. 1. Row bar 1 (see FIG. 2) that is the object of inspection is a block comprising a ceramic wafer made of altic material (i.e., Al2O3-TiC) having formed thereon a plurality of head elements by a membrane-forming method, e.g., sputtering, and lithographic technique, and then wafer is cut out one by one with a grinding wheel or a wire saw and a plurality of head elements (about 45) are linked. Row bar 1 has a length L of about 2 inches, and a thickness t of about 0.3 mm. In the first place, in the first measuring step 100, GMR element 540 on row bar 1 of the object of inspection or GMR element 540 on slider 52 is measured for the output against external magnetic field. In the next place in step 102, prescribed shearing stress is applied with an indenter to the edge formed by GMR element-formed surface of row bar 1 or slider 52 and the air-bearing surface. Then in the second measuring step 104, the output of GMR element 540 is measured again. Lastly in step 106, the outputs of the GMR element before and after application of stress are compared, and when the amount of degradation is higher than the prescribed standard, the product is regarded as disqualification, and the case of satisfying the prescribed standard is regarded as acceptance.

Figure 2:
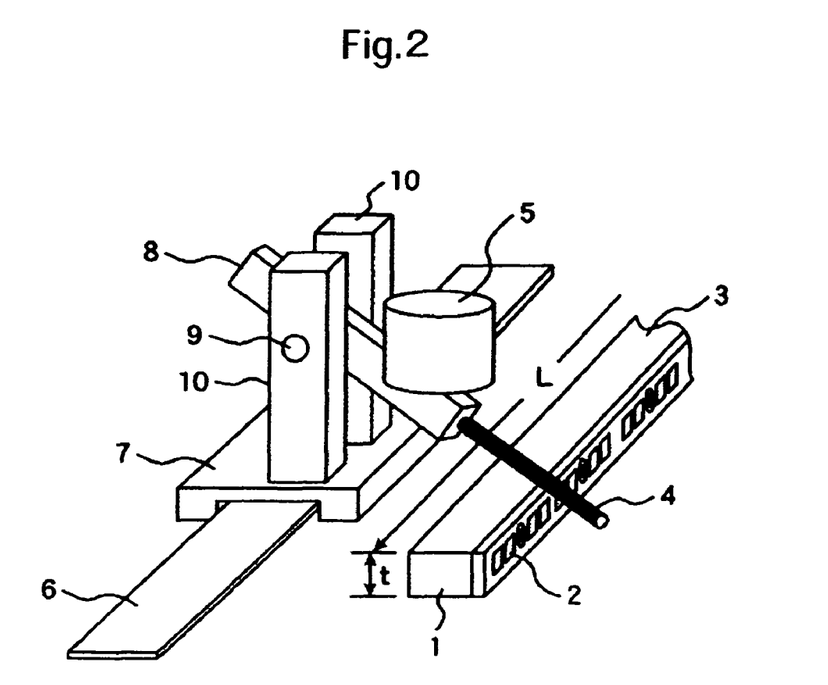
FIG. 2 is a drawing showing the constitution of the stress applying apparatus for use in the inspection method of a magnetic head in accordance with an embodiment of the present invention.

The construction of the stress applying apparatus used in the above inspecting method of a magnetic head is shown in FIG. 2. Slide rail 6 and base 7 sliding on slide rail 6 are installed in parallel to row bar 1 (see FIG. 2) that is the object of inspection. Row bar 1 is installed with the air-bearing surface 3 (that is, air-bearing surface 56 of the magnetic head) thereof facing upward and element-formed surface 2 to the side opposite to slide rail 6. Two columns 10 are fixed on base 7, and shaft 9 is installed between two columns. Shaft 9 is equipped with rod 8 rotating around shaft 9, and cylindrical indenter 4 made of a resin is fixed at the tip end portion of rod 8. Indenter 4 is in contact with the edge where element-formed surface 2 of row bar 1 and air-bearing surface 3 are crossed. Weight 5 is arranged at the tip of rod 8, and by changing the weight of weight 5, the force of indenter 4 touching with row bar 1 can be changed. By moving base 7 on slide rail 6 with maintaining indenter 4 being in contact with the edge formed by air-bearing surface 3 of row bar 1 and element-formed surface 2, shearing stress can be generated in the track width direction of GMR element 540 (in the direction parallel to air-bearing surface 3).

In some embodiments, indenter 4 is made of a nylon resin or polyether ether ketone resin blended with graphite to impart electrical conductivity, and electrical conductivity prevents electrostatic charge, and GMR element 540 is prevented from damaging by electric discharge at the time of touching with indenter 4, or tribo-charge in sliding. The dynamic friction coefficient with the surface of the row bar may be approximately 0.1, but the range may be from approximately 0.05 to approximately 0.4. The angle of contact of indenter 4 may be in the range from approximately 10° to approximately 45° against air-bearing surface 3, and indenter 4 is arranged so that the force is applied in perpendicular direction to air-bearing surface 3.

Figure 3:
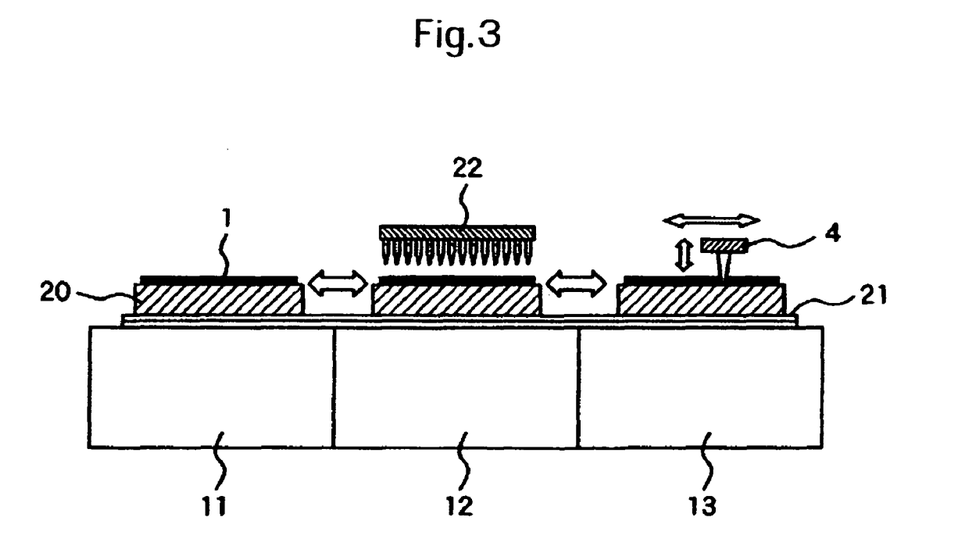
FIG. 3 is a drawing showing the constitution of the automatic stress resistance inspecting apparatus for realizing the inspection method of a magnetic head in accordance with an embodiment of the present invention.

The construction of an automatic inspecting apparatus used in the inspection of the magnetic head is shown in FIG. 3. The inspecting apparatus has three stations of work loading part 11, element output measuring part 12, and stress applying part 13. The apparatus is constituted such that transfer rail 21 is installed striding over each station, and transfer holder 20 loading row bar 1 or slider 52 as the work can be moved on transfer rail 21. The work (row bar 1) loaded on holder 20 is transferred to element output measuring part 12 at work loading part 11, where probe 22 movable up and down is brought into contact with terminal 55 of each GMR element 540, and the output of GMR element 540 is measured while applying variable magnetic field with a magnetic field-applying means in perpendicular direction to air-bearing surface 3. The magnetic field applied at the time of measuring time is approximately 300 Oe (24 KA/m) in the plus and minus directions, and direct bias current of approximately 1 mA is applied to GMR element 540 through probe 22. Further, transfer holder 20 is transferred to stress applying part 13, and shearing stress is applied to GMR element 540 by pressing indenter 4 whose pressure loading is controlled to a prescribed value against the side end part of air-bearing surface of element-formed surface 2 (refer to FIG. 2) and sliding on work 1. After application of stress, work 1 is again transferred to element output measuring part 12, and the output of GMR element 540 is again measured, whereby the variation of output of the element before and after application of stress can be inspected.

Figure 4:
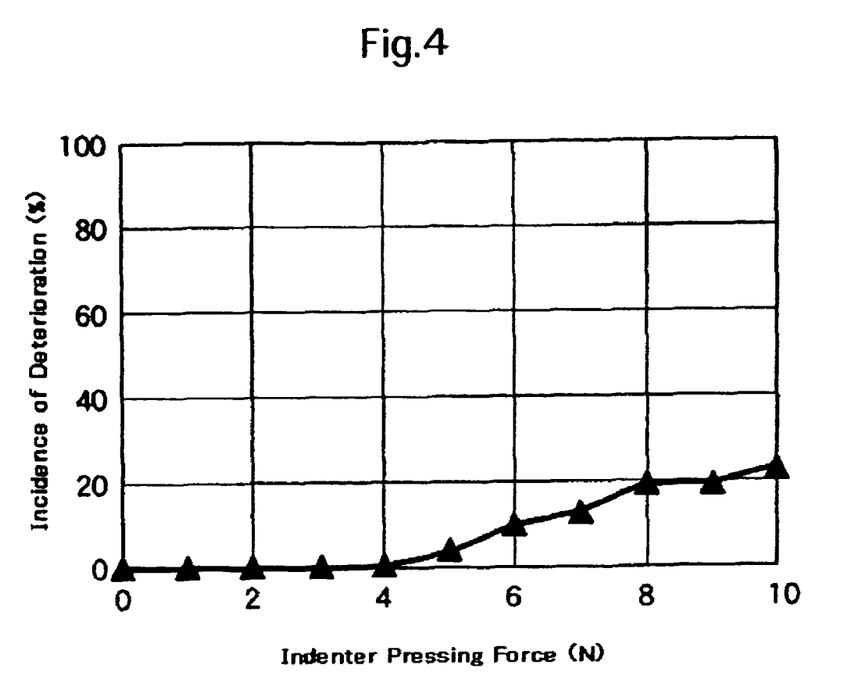
FIG. 4 is a drawing showing the relationship between the pressing force of the indenter of the stress applying apparatus and the incidence of the output deterioration of the element.
Figure 5:
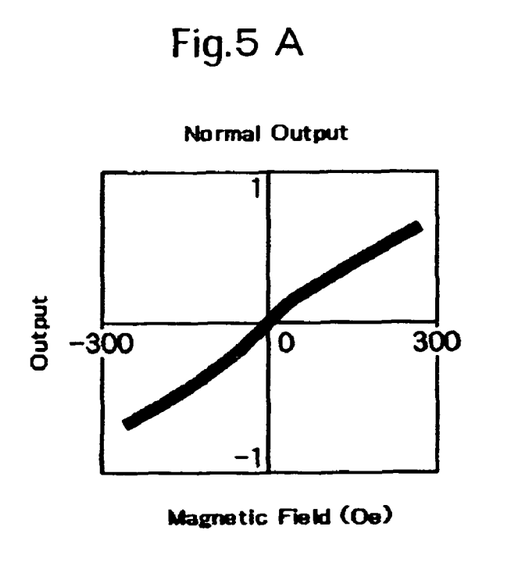
FIG. 5A is a drawing showing the output characteristics of a normal GMR element.
FIG. 5B is a drawing showing the output characteristics of GMR element that is lowered in output.
FIG. 5C is a drawing showing the output characteristics of GMR element accompanied by the reversal of output polarity.
FIG. 5D is a drawing showing the resistance variation curve of a normal GMR element.
FIG. 5E is a drawing showing the resistance variation curve of a GMR element deteriorated in Hp.
FIG. 5F is a drawing showing the resistance variation curve of a GMR element in which hysteresis occurs.

The pressing force of indenter 4 was gradually increased and slid on a plurality of the same kind head elements, the output values of GMR elements were measured every time, and the proportions of head elements whose output deterioration fluctuated exceeding the prescribed value were plotted and shown in FIG. 4. The measurement of the output value was performed by applying alternating magnetic field of approximately 300 Oe (24 KA/m) in perpendicular direction and in the plus and minus directions to the air-bearing surface of the objective GMR element of measurement, and at the same time, constant current of approximately 1 mA was applied to the GMR element, and the changed amount in potential at both ends of the GMR element at this time was inspected. With the increase in pressing force of indenter 4, the incidence of deteriorated GMR elements increases like this. The output characteristics of a normal GMR element is shown in FIG. 5A. Representative output characteristics at the time of output lowering is shown in FIG. 5B, and output characteristics of deterioration accompanied by the reversal of output polarity is shown in FIG. 5C. Here, the case where elements deteriorate by approximately 20% or more to normal output and the case where the output polarity is reversed are defined as deterioration.

As the items of measurement, not only the above output value but also the change in a resistance variation curve within the range of the same magnetic field change or to magnetic field change at the time of applying strong magnetic field of approximately plus and minus 1T or so may be used as the index. As an example, a resistance variation curve of a normal GMR element is shown in FIG. 5D. In the figure, the size of Hp shown by an arrow shows the stability of the magnetized fixing layer of the GMR element. Contrary to this, in FIG. 5E, it can be seen that Hp deteriorates and weakens. In addition, the judgment of abnormality can be done with the generation of hysteresis as the index as shown in FIG. 5F.

To what a degree of stress a magnetic head has to endure in a hard disc drive (HDD) in practice cannot be decided unconditionally, since this is closely related to the environment under which HDD is used, operation control of a magnetic head in HDD, and the surface state of a magnetic disc. However, from the above evaluation results, forecast can be made by the manner that assemblage A (F) of conforming articles which satisfy the prescribed value of GMR element output variations when fixed pressing force F is applied is mounted on HDD and a certain reliability test is performed. As the reliability test, there is a method of measuring error rate after continuous operation (approximately 100 hours to approximately 200 hours) at high temperature (about 85° C.) and high humidity (about 85%). When head assemblage A (Fi) of every Fi is mounted on HDD and the incidence of failure by reliability test is found by changing pressing force in some degrees and the incidence of failure to pressing force F shows the variation as FIG. 6, force F1 that is lower than the aiming incidence of failure can be regarded as the least upper bound of the stress that the magnetic head undergoes in HDD. Accordingly, by performing the above inspection with F1 or higher force F, selecting the magnetic heads capable of enduring the inspection, and mounting the heads on HDD, products low in the incidence of failure can be provided.

Figure 7:
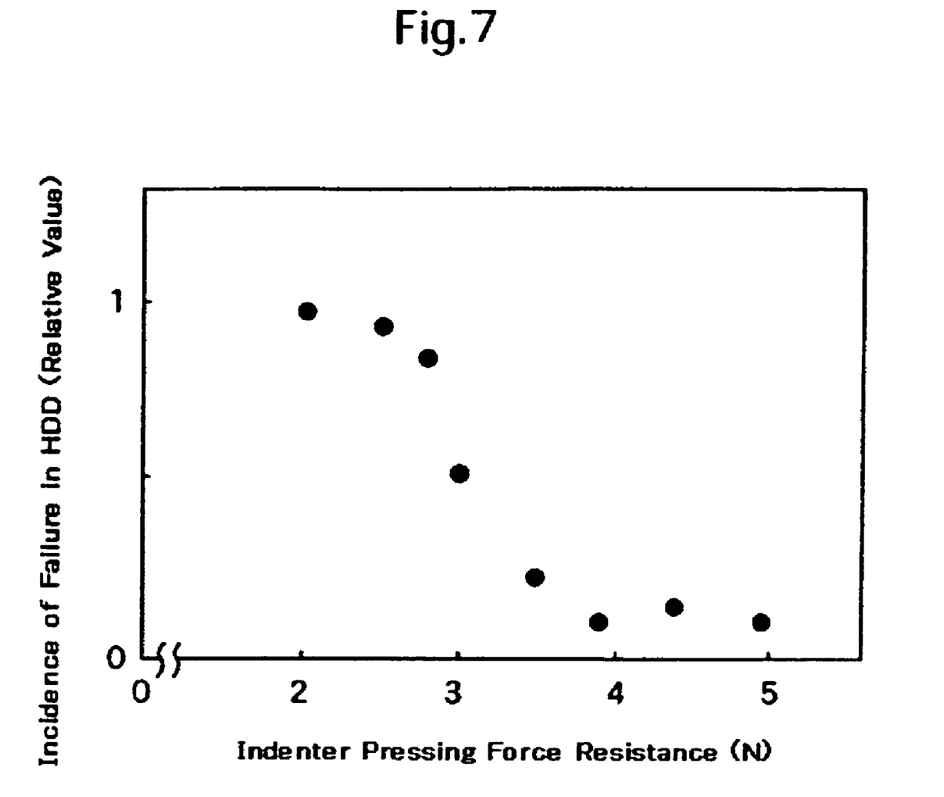
FIG. 7 is a drawing showing the relationship between indenter pressing force resistance and the incidence of failure in HDD.

It is already known that distribution of the incidence of deterioration as shown in FIG. 4 is influenced by the structures and materials of GMR element, so that the element structures and materials that are resistant to external stresses can be selected according to this evaluation method. Assemblage of several kinds of head elements varied in element structures and materials was subjected to the above inspection, as the resistance to indenter pressing force, the indenter pressing force that causes the incidence of deterioration as shown in FIG. 4 (the proportion of head elements that showed output reduction after application of stress of approximately 20% or more) of approximately 5% or more was found with every kind on average, and this value was taken as the ordinate, further, these head elements were built in HDD with every kind and a definite reliability test was performed, and the proportion of the head elements that generated failure thereafter was taken as the abscissa and plotted, which is shown in FIG. 7. It can be seen that the occurrence of failure in HDD is closely related with the resistance against the pressing with an indenter found by the measurement. The method of the inspection of the invention can be used as the index of evaluation of judgment of what a structure and material of element result in highly reliable element in HDD.

As can be seen from the results shown in FIG. 4, stresses generating deterioration are not regular in the same kind of head elements, for example, even when highly resisting structure and material are selected and designed, there is the possibility that elements liable to deteriorate against stress are included in every magnetic head mass produced.

Figure 8:
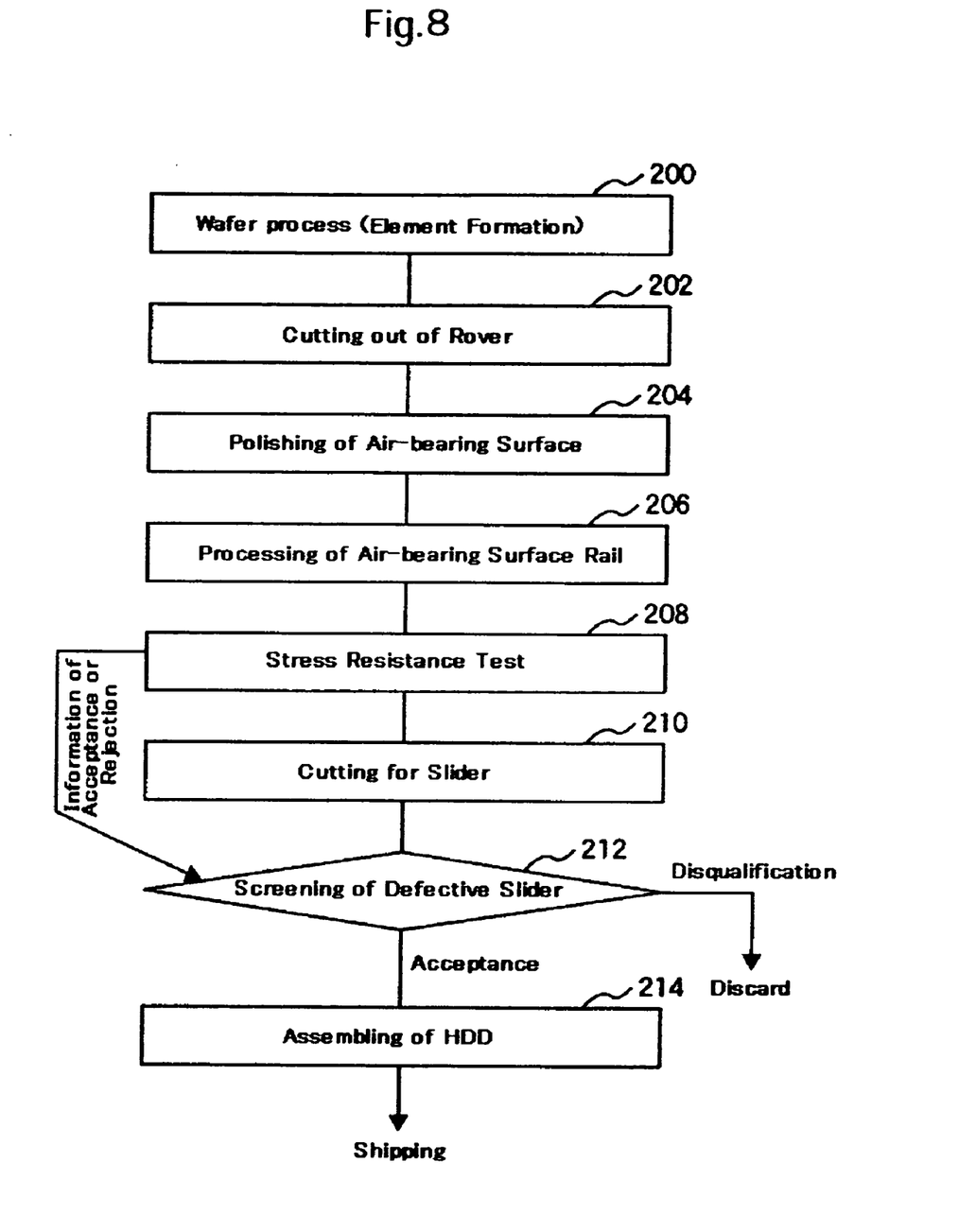
FIG. 8 is a drawing showing the manufacturing method of a magnetic head in accordance with an embodiment of the present invention, and the manufacturing method of HDD in accordance with an embodiment of the present invention.

Therefore, in an embodiment of the present invention, the manufacturing method of magnetic heads using the above inspection method as screening of heads in the mass production process of magnetic heads is shown as flow chart in FIG. 8. In step 200, a GRM element, a recording element and an output terminal are formed on a ceramic wafer by a membrane-forming method and lithographic technique. In the next place in step 202, row bar 1 in the state of row of several tens of sliders is cut out, and in step 204, air-bearing surface 3 is polished to make it flat while maintaining the state of row bar 1 as it is, and at the same time, element height h of GMR element 540 is processed to a prescribed length. After processing of the rail of air-bearing surface 3 in step 206, a stress resisting test is performed in step 208 in the state of row bar 1, and the head elements whose output fluctuation before and after application of stress of prescribed pressing force Ft is within the prescribed tolerance are regarded as acceptance, and others are disqualification. Tested row bar 1 is in the state of row of a plurality of sliders at this point of time, so that it goes to the next step and cut to separate slider in step 210. After that, sliders on which disqualified elements are loaded are discarded and accepted products alone are selected in step 212 based on the information of acceptance or rejection of stress resisting test (step 208).

Figure 6:
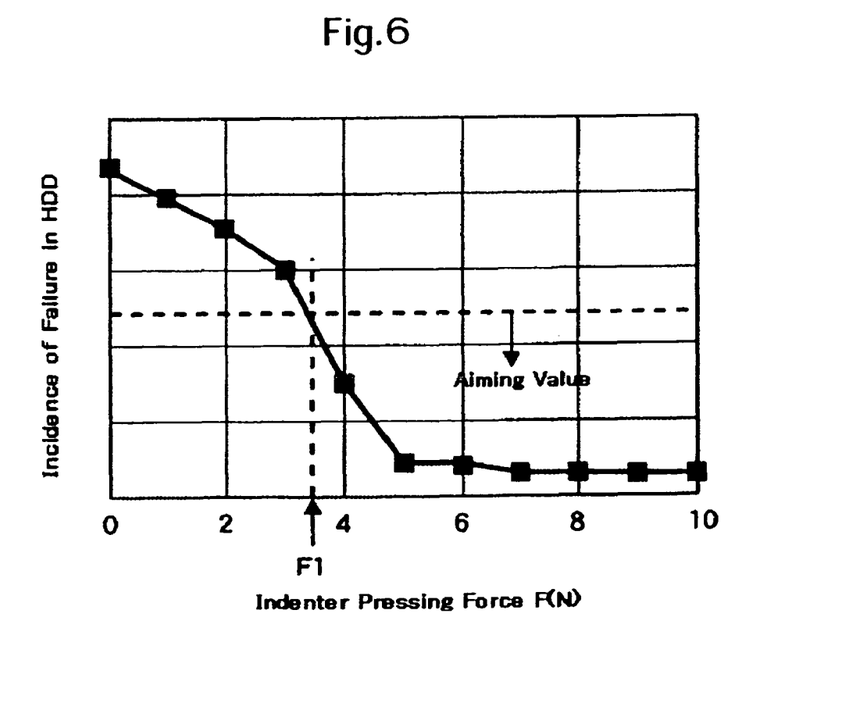
FIG. 6 is a drawing showing the incidence of failure of magnetic heads in HDD selected by indenter pressing force F.

The method to decide pressing force Ft as standard in the above stress resistance test (step 208) is described below. In the embodiment, the pressing force is applied by dividing to 10 stages of from 0 to 10N, and the magnetic heads whose output variation is included in the prescribed value alone are selected with every F and built in HDD, and the incidence of failure of heads in definite reliability test was found with every assemblage. The results are the same as shown in FIG. 6. Since force F1 that is lower than the aiming incidence of failure can be regarded as the least upper bound of the stress that the magnetic head undergoes in HDD, the indenter pressing force Ft as standard has to be higher than F1, so that the standard pressing force in the invention is set at approximately 1.2 times as large as F1 taking a margin.

The process of stress resistance test can be performed before processing the rail of air-bearing surface, if after polishing processing of air-bearing surface. Alternatively, it is possible to perform stress resistance test after cutting slider with every slider to judge acceptance or rejection on the spot and discard the rejected products.

According to an embodiment of the present invention, since screening of defective elements can be carried out in the mass production process of magnetic heads, generation of failure ascribable to heads themselves occurring after HDD assembling can be reduced. Magnetic heads selected as accepted products are stable in the magnetization vector of the fixing layer of magneto-resistive effect element, and the reduction of reproduction output and the reversal of output polarity never occur.

In some embodiments, every head element was tested for stress resistance, but for saving time taken by test, a part of row bars alone of each wafer may be preferentially subjected to polishing processing of air-bearing surface and stress resistance test, and if, of the tested elements, the proportion of rejected elements is higher than a definite value, all of the wafer may be discarded. By such a procedure, the generation of a great amount of failures due to something unusual in wafer process can be detected in early stage, so that the yield of accepted products in the screening process of defective sliders can be raised.

As another embodiment of the present invention, the manufacturing method of HDD is described below with reference to FIG. 8. The steps up to step 212 are the same as in the embodiment described above. The present embodiment is characterized in that the magnetic heads graded accepted products in defective slider screening step 212 are built in HDD in HDD assembling step 214. The occurrence of failure in the reliability test of HDD could be reduced to ⅕ from the failure before test. According to this embodiment, HDD little in the incidence of failure can be provided. Further, the obtained HDD is free from the reduction of reproduction output and the reversal of output polarity, so that highly reliable HDD having a high reproduction signal quality can be realized.

As described above, by using the inspection method of magnetic heads, the resistance against external stress of GMR element can be evaluated, which can be the index of evaluation in judging what a structure and material in the design of element can make a highly reliable element in HDD. Further, by using the inspection method in screening of defective elements in the mass production process of magnetic heads, generation of failure ascribable to heads themselves occurring after HDD assembling can be reduced. Further, magnetic heads graded accepted products in the manufacturing method of magnetic heads are stable in the magnetization vector of the fixing layer of magneto-resistive effect element, and the reduction of reproduction output and the reversal of output polarity never occur. By building magnetic heads graded accepted products in the manufacturing method of magnetic heads into HDD, HDD low in the incidence of failure can be provided. In addition, HDD loading magnetic heads graded accepted products in the manufacturing method of magnetic heads is never accompanied by the reduction of reproduction output and the reversal of output polarity, and can be a highly reliable HDD having a high reproduction signal quality.

In each of the above embodiments, a CIP type GMR element was used as the magneto-resistive effect element, but a GMR element is not restricted thereto, and a GMR element may be a CPP (Current Perpendicular to the Plane) type GMR element and a TMR (Tunneling Magneto-resistive) element each having a fixed layer. And even in such a case, the obtained effect is the same as in the above embodiments.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A method of inspection of a magnetic head having an element-formed surface on which magneto-resistive effect element having a fixed layer and a free layer are formed, and an air-bearing surface including:
   a first measuring step of applying a variable magnetic field on the air-bearing surface, and measuring the output of the magneto-resistive effect element,
   a step of applying shearing stress to the edge where the element-formed surface and the air-bearing surface of the magnetic head are crossed in the direction parallel to the air-bearing surface,
   a second measuring step of applying a variable magnetic field to the air-bearing surface of the magnetic head after the application of shearing stress, and measuring the output of the magneto-resistive effect element, and
   a step of comparing the outputs of the magneto-resistive effect element measured before and after the application of shearing stress.

2. The method of inspection of a magnetic head as claimed in claim 1, wherein the direction parallel to the air-bearing surface in the step of shearing stress application is the track width direction of the magnetic head.

3. The method of inspection of a magnetic head as claimed in claim 1, wherein the variable magnetic field applied to the air-bearing surface is an alternating magnetic field.

4. The method of inspection of a magnetic head as claimed in claim 1, wherein the measurement of the outputs of the magneto-resistive effect element in the first and second measuring steps is performed by applying direct electric current to the magneto-resistive effect element, and applying an alternating magnetic field to the air-bearing surface in the plus and minus directions.

5. The method of inspection of a magnetic head as claimed in claim 1, wherein the application of shearing stress is performed by pressing an indenter against the edge where the element-formed surface and the air-bearing surface of the magnetic head are crossed, and sliding the indenter in the direction parallel to the air-bearing surface.

6. The method of inspection of a magnetic head as claimed in claim 5, wherein the indenter is brought into contact with the air-bearing surface at the angle of from approximately 10° to approximately 45°.

7. The method of inspection of a magnetic head as claimed in claim 5, wherein the indenter is made of an electrically conductive resin.

8. A magnetic head having:
   a slider having an element-formed surface and an air-bearing surface, and
   a head element including a magneto-resistive effect element having a fixed layer and a free layer formed on the element-formed surface of the slider, where after applying shearing stress to the edge where the element-formed surface and the air-bearing surface are crossed in the direction parallel to the air-bearing surface, the output of the magneto-resistive effect element is not reduced by 20% or more to the output before application of shearing stress.

9. A magnetic disc drive having:
   a magnetic head having a slider having an element-formed surface and an air-bearing surface, a head element including a magneto-resistive effect element having a fixed layer and a free layer formed on the element-formed surface of the slider, where after applying shearing stress to the edge where the element-formed surface and the air-bearing surface are crossed in the direction parallel to the air-bearing surface, the output of the magneto-resistive effect element is not reduced by approximately 20% or more to the output before application of shearing stress,
   and a magnetic disc holding data reproduced by the magnetic head.

* * * * *